(12) United States Patent
Liu et al.

(10) Patent No.: US 10,134,151 B2
(45) Date of Patent: Nov. 20, 2018

(54) VERIFICATION METHOD AND SYSTEM FOR PEOPLE COUNTING AND COMPUTER READABLE STORAGE MEDIUM

(71) Applicant: VIVOTEK INC., New Taipei (TW)

(72) Inventors: Cheng-Chieh Liu, New Taipei (TW); Szu-Mo Chang, New Taipei (TW); Wei-Ming Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 88 days.

(21) Appl. No.: 15/404,177

(22) Filed: Jan. 11, 2017

(65) Prior Publication Data

US 2017/0278264 A1    Sep. 28, 2017

(30) Foreign Application Priority Data

Mar. 24, 2016  (TW) .............................. 105109138 A (51) Int. Cl.
*G06T 7/70* (2017.01)

(52) U.S. Cl.
CPC ...... *G06T 7/70* (2017.01); *G06T 2207/30196* (2013.01); *G06T 2207/30242* (2013.01)

(58) Field of Classification Search
CPC ..... G06K 9/00288; G06K 2009/00328; G06K 9/00677; G06K 9/00248; G06K 9/00261;
(Continued)

(56) References Cited

U.S. PATENT DOCUMENTS 4,630,110 A * 12/1986 Cotton .................. G07G 3/003
    200/86 R
4,874,063 A * 10/1989 Taylor .................. B66B 5/0006
    187/391
(Continued)

FOREIGN PATENT DOCUMENTS

| CN | 101021949 A | 8/2007 |
| CN | 101540892 A | 9/2009 |
| CN | 101996536 A | 3/2011 |
| CN | 102054167 A | 5/2011 |
| TW | 201118803 A1 | 6/2011 |

OTHER PUBLICATIONS

C.H. Chen, Y. C. Chang, T.Y. Chen, and D.J. Wang, People Counting System for Getting In/Out of a Bus Based on Video Processing, Intelligent Systems Design and Applications, Nov. 26-28, 2008, pp. 565-569, IEEE, Kaohsiung, Taiwan.

(Continued)

*Primary Examiner* — Aklilu Woldemariam
(74) *Attorney, Agent, or Firm* — Winston Hsu (57) ABSTRACT

A verification method for people counting includes steps of displaying a people counting video by a display device, wherein the people counting video shows an entry and exit boundary and an accumulated number of persons; when at least one person exists in the people counting video, displaying an initial position and a current position of each of the at least one person by the display device; determining whether each of the at least one person passes across the entry and exit boundary according to the initial position and the current position of each of the at least one person by a user, so as to determine whether the accumulated number of persons is incorrect; and when the user determines that the accumulated number of persons is incorrect, receiving a modified number of persons from the user by an input device.

17 Claims, 6 Drawing Sheets

(58) Field of Classification Search
CPC ........... G06K 9/00281; G06K 9/00295; G06K 9/00778; G06K 9/00771; G06K 9/00221; G06K 9/00228; G06K 9/00369; G06K 9/00026; G06K 9/00268; G06K 9/2018; G06Q 30/0241; G06Q 30/0277; G06Q 50/01; G06Q 10/10; G06Q 10/0635; G06Q 50/265; G06Q 50/34; G06Q 90/00; G06Q 30/02; G06Q 30/0201; G06Q 30/0261; G06F 17/30864; G06F 17/30259; G06F 17/30289; G06F 2216/01; G06F 2203/04803; G06F 3/0487; G06F 3/04847; G06T 2207/30196; G06T 2207/30242; G06T 7/70; G06T 7/20; G06T 2207/10016; G06T 2207/30232; G06T 7/0016; G06T 7/246; G06T 7/50; G06T 7/55; G06T 7/579; G06T 7/62; G06T 7/73; G06T 11/60; G06T 7/292; G07B 15/00; G07B 5/04; G07F 17/3279; G07F 17/3288; Y10S 707/99933; A63F 3/00157; A63F 2009/2441; G07C 9/00; G08B 13/19615; G08B 21/043; G08B 13/19634; A61B 5/055; A61B 5/1113; A61B 5/746; A61B 6/10; A61B 6/107; A61B 6/4494; A61B 6/54; G01S 15/42; G01S 15/88; G01S 17/023; G01S 17/10; G01S 17/88; G01S 7/4813; G01S 7/483; G01S 7/497; G01S 3/781; G01S 3/783; G01S 3/801; G01S 3/8032; G01S 5/16; G01S 5/18; G07G 3/003; H04N 21/25891; H04N 21/41415; H04N 21/4223; H04N 21/44218; H04N 21/44222; H04N 21/6582; H04H 60/33; H04H 60/45
USPC ........ 382/103, 118, 192; 340/518, 522, 532; 348/143, 156
See application file for complete search history.

(56) References Cited

U.S. PATENT DOCUMENTS

| | | | | |
|---|---|---|---|---|
| 5,465,115 | A * | 11/1995 | Conrad | G06K 9/00778 348/155 |
| 8,549,028 | B1 * | 10/2013 | Alon | G06F 17/30424 707/769 |
| 9,041,531 | B1 * | 5/2015 | DeLand | G05B 1/01 340/539.12 |
| 2002/0097193 | A1 * | 7/2002 | Powers | G06Q 30/02 345/2.3 |
| 2010/0063862 | A1 * | 3/2010 | Thompson | G06Q 30/02 705/7.29 |
| 2013/0259298 | A1 * | 10/2013 | Srinivasan | G06K 9/00369 382/103 |
| 2013/0259381 | A1 * | 10/2013 | Srinivasan | G06K 9/00221 382/192 |
| 2013/0262179 | A1 * | 10/2013 | Harada | G06Q 30/0201 705/7.29 |
| 2014/0119594 | A1 * | 5/2014 | Chou | G07C 9/00 382/103 |
| 2014/0201126 | A1 * | 7/2014 | Zadeh | G06K 9/627 706/52 |
| 2015/0012530 | A1 * | 1/2015 | Whitehead | G06Q 10/10 707/732 |
| 2015/0131872 | A1 * | 5/2015 | Ganong | G06K 9/00677 382/118 |
| 2016/0191865 | A1 * | 6/2016 | Beiser | G06K 9/00221 348/156 |
| 2017/0177948 | A1 * | 6/2017 | Srinivasan | G06K 9/00221 |
| 2018/0046855 | A1 * | 2/2018 | Ganong | G06F 17/30247 |

OTHER PUBLICATIONS

F. Chen and E. Zhang, A Fast and Robust People Counting Method in Video Surveillance, International Conference on Computational Intelligence and Security, Dec. 15-19, 2007, pp. 339-343, IEEE, Beijing, China.

* cited by examiner

VERIFICATION METHOD AND SYSTEM FOR PEOPLE COUNTING AND COMPUTER READABLE STORAGE MEDIUM

CROSS REFERENCE TO RELATED APPLICATION

This application claims the benefit of Taiwan Application No. 105109138, which was filed on Mar. 24, 2016, and is incorporated herein by reference.

BACKGROUND OF THE INVENTION

1. Field of the Invention

The invention relates to a verification method and system for people counting and, more particularly, to a verification method and system allowing a user to easily determine whether the accumulated number of persons is incorrect.

2. Description of the Prior Art

A system, which counts the number of persons automatically by analyzing a video content, is now in widespread use. To evaluate the accuracy of people counting generated by the system objectively and effectively, it usually needs a person to verify the counting result. A conventional manner is to assign a person to a site and then the person counts the number of persons by pressing a counter at the site. The problem of the aforesaid manner is that the person cannot keep his/her attention without distraction for a long span of time, such that he/she may make a mistake. Especially, once there are lots of persons passing through the site simultaneously, the person cannot always count the correct number of persons. Furthermore, it is very difficult to verify whether the number of persons counted by the person is incorrect.

SUMMARY OF THE INVENTION

An objective of the invention is to provide a verification method and system allowing a user to easily determine whether the accumulated number of persons is incorrect, so as to solve the aforesaid problems.

According to an embodiment of the invention, a verification method for people counting comprises steps of displaying a people counting video by a display device, wherein the people counting video shows an entry and exit boundary and an accumulated number of persons; when at least one person exists in the people counting video, displaying an initial position and a current position of each of the at least one person by the display device; determining whether each of the at least one person passes across the entry and exit boundary according to the initial position and the current position of each of the at least one person by a user, so as to determine whether the accumulated number of persons is incorrect; and when the user determines that the accumulated number of persons is incorrect, receiving a modified number of persons from the user by an input device.

According to another embodiment of the invention, a verification system for people counting comprises a display device and an input device. The display device displays a people counting video, wherein the people counting video shows an entry and exit boundary and an accumulated number of persons. The input device communicates with the display device. When at least one person exists in the people counting video, the display device displays an initial position and a current position of each of the at least one person. A user determines whether each of the at least one person passes across the entry and exit boundary according to the initial position and the current position of each of the at least one person, so as to determine whether the accumulated number of persons is incorrect. When the user determines that the accumulated number of persons is incorrect, the input device receives a modified number of persons from the user.

According to another embodiment of the invention, a non-transitory computer readable storage medium for storing a set of computer-executable instructions, when executed, causing a display device to perform steps of displaying a people counting video, wherein the people counting video shows an entry and exit boundary and an accumulated number of persons; displaying an initial position and a current position of each of at least one person when the at least one person exists in the people counting video, wherein a user determines whether each of the at least one person passes across the entry and exit boundary according to the initial position and the current position of each of the at least one person, so as to determine whether the accumulated number of persons is incorrect; and receiving a modified number of persons from the user by an input device when the user determines that the accumulated number of persons is incorrect.

As mentioned in the above, the user can determine whether a person passes across the entry and exit boundary according to the initial position and the current position of the person, so as to determine whether the accumulated number of persons is incorrect. When the user determines that the accumulated number of persons is incorrect, the user can operate the input device to input the modified number of persons. Accordingly, the input frequency of the user can be reduced and the user can determine whether the accumulated number of persons is incorrect more easily. Furthermore, the invention may evaluate the accuracy of people counting according to the modified number of persons inputted by the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
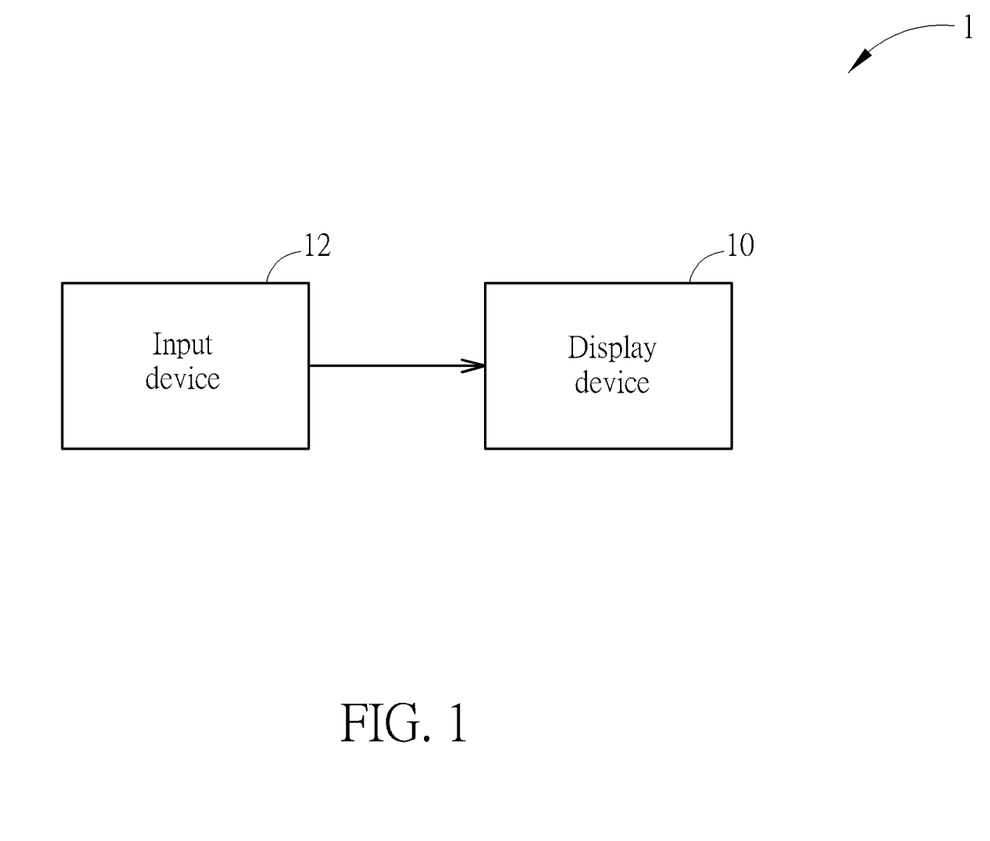
FIG. 1 is a functional block diagram illustrating a verification system for people counting according to an embodiment of the invention.
Figure 2:
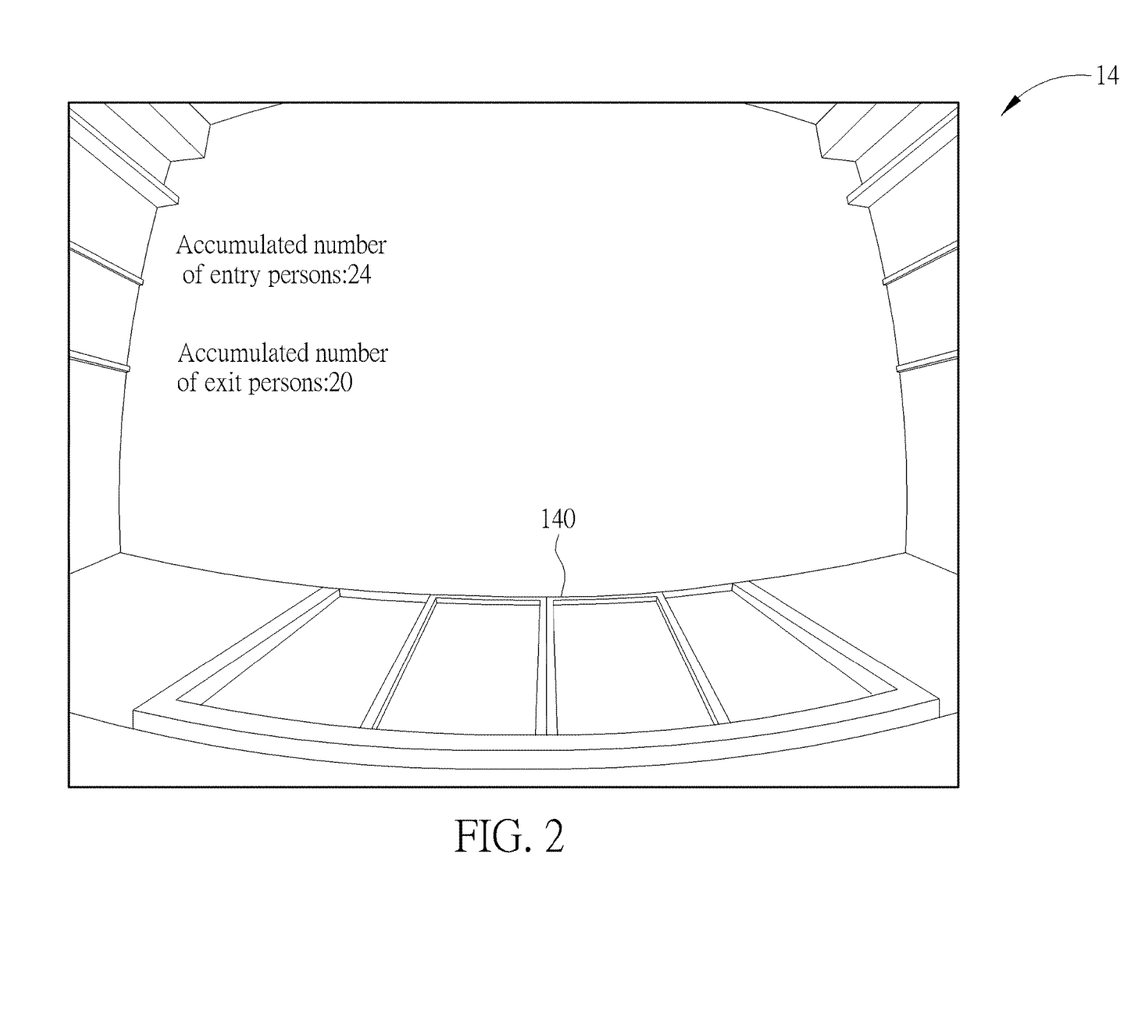
FIG. 2 is a schematic diagram illustrating the display device shown in FIG. 1 displaying a people counting video.
Figure 3:
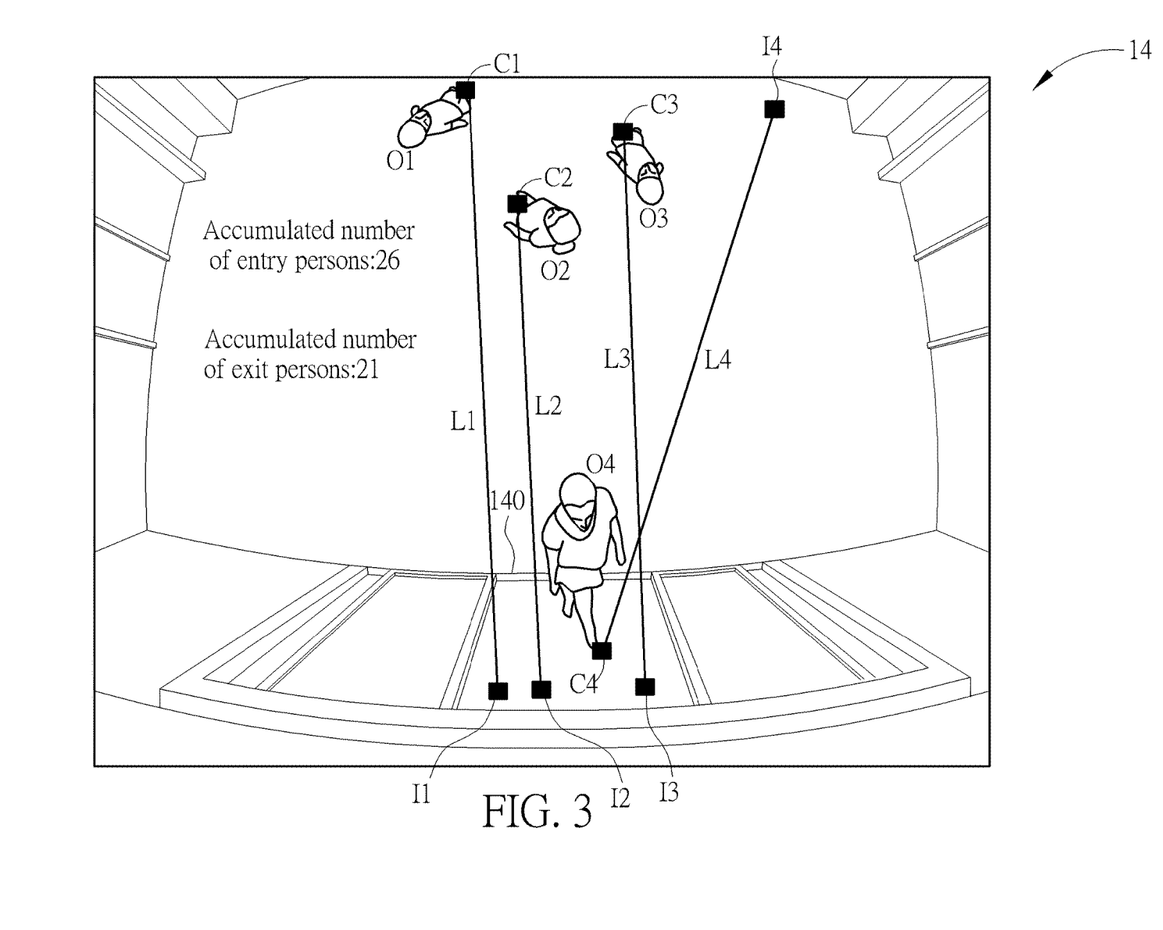
FIG. 3 is another schematic diagram illustrating the display device shown in FIG. 1 displaying the people counting video.
Figure 4:
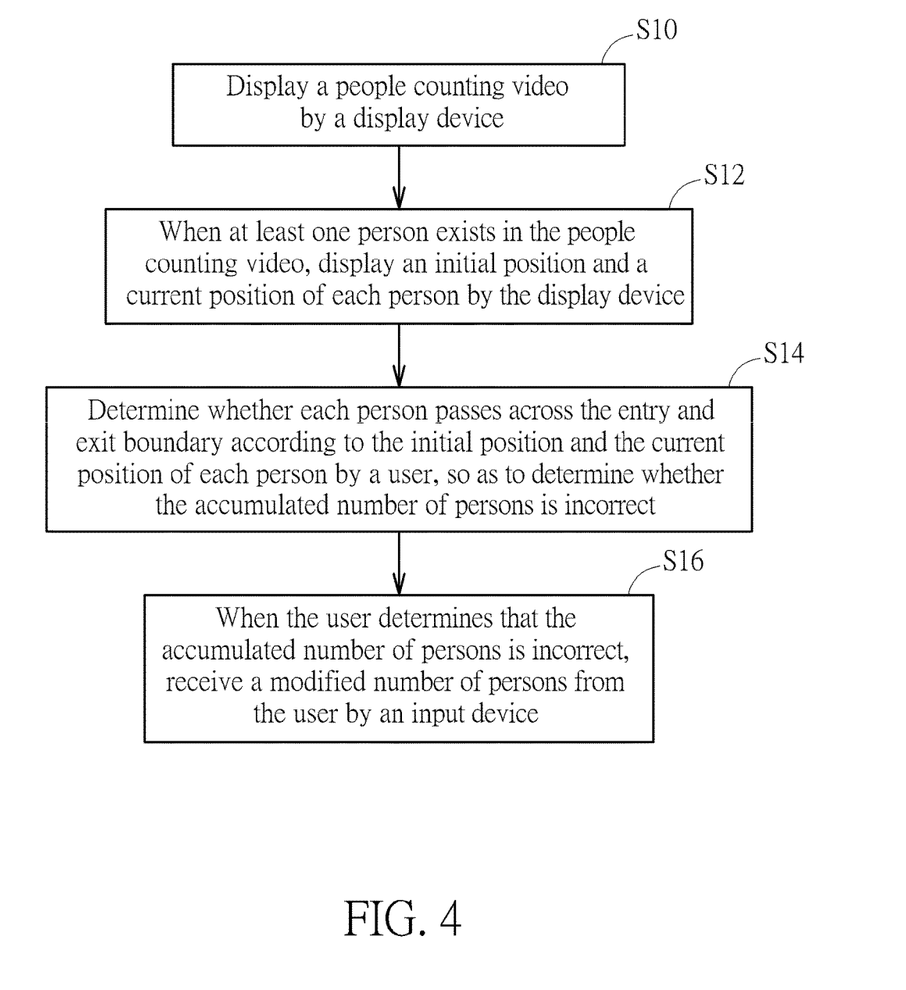
FIG. 4 is a flowchart illustrating a verification method for people counting according to an embodiment of the invention.

Referring to FIGS. 1 to 4, FIG. 1 is a functional block diagram illustrating a verification system 1 for people counting according to an embodiment of the invention, FIG. 2 is a schematic diagram illustrating the display device 10 shown in FIG. 1 displaying a people counting video 14, FIG. 3 is another schematic diagram illustrating the display device 10 shown in FIG. 1 displaying the people counting video 14, and FIG. 4 is a flowchart illustrating a verification method for people counting according to an embodiment of the invention. The verification method for people counting shown in FIG. 4 is adapted to the verification system 1 for people counting shown in FIG. 1.

As shown in FIG. 1, the verification system 1 for people counting comprises a display device 10 and an input device 12, wherein the input device 12 communicates with the display device 10. In this embodiment, the display device 10 may be a computer screen, a monitor, a television, a tablet computer or other electronic devices with display function, and the input device 12 may be a keyboard, a touch panel or other electronic devices with input function. In practical applications, the input device 12 may communicate with the display device 10 by wired or wireless manner.

When the verification system 1 is used for verifying people counting, first of all, the display device 10 displays a people counting video 14 (step S10 in FIG. 4), wherein the people counting video 14 shows an entry and exit boundary 140 and the accumulated number of persons, and the accumulated number of persons comprises at least one of the accumulated number of entry persons and the accumulated number of exit persons. In this embodiment, the accumulated number of persons may comprise the accumulated number of entry persons and the accumulated number of exit persons. As shown in FIG. 2, the display device 10 displays the accumulated number of entry persons as 24 and displays the accumulated number of exit persons as 20. However, in another embodiment, the accumulated number of persons may comprise the accumulated number of entry persons only or the accumulated number of exit persons only according to practical applications. In this embodiment, the number of persons means, but not limited to, the number of visitors.

In this embodiment, the accumulated number of entry persons may be defined as the total number of persons who walks from bottom to top in the FIG. 2 and passes across the entry and exit boundary 140, and the accumulated number of exit persons may be defined as the total number of persons who walks from top to bottom in the FIG. 2 and passes across the entry and exit boundary 140. Furthermore, the people counting video 14 is recorded in advance and the accumulated number of persons at each time point has been analyzed and calculated by an automatic people counting system. It should be noted that how to analyze and calculate the accumulated number of persons at each time point by the automatic people counting system is well known by one skilled in the art and it may refer to "C. H. Chen, Y, C. Chang, T. Y. Chen, and D. J. Wang, "People Counting System for Getting In/Out of a Bus Based on Video Processing," Intelligent Systems Design and Applications, 2008. ISDA '08. Eighth International Conference on, vol. 3, pp. 565-569, 2008 and F. Chen and E. Zhang. A Fast and Robust People Counting Method in Video Surveillance. IEEE International Conference on Computational Intelligence and Security, pages 339-343, 2007", so it will not be depicted in detail herein.

Then, when at least one person exists in the people counting video 14, the display device displays an initial position and a current position of each person (step S12 in FIG. 4). As shown in FIG. 3, four persons O1-O4 exist in the people counting video 14, wherein the initial position and the current position of the person O1 are I1 and C1, the initial position and the current position of the person O2 are I2 and C2, the initial position and the current position of the person O3 are I3 and C3, and the initial position and the current position of the person O4 are I4 and C4. In this embodiment, the invention may label the initial positions I1-I4 and the current positions C1-C4 of the persons O1-O4 in the people counting video 14 by analyzing walking paths of the persons O1-O4. Furthermore, the display device 10 of the invention may display line patterns L1-L4 connecting the initial position I1-I4 and the current position C1-C4 of the persons O1-O4. Accordingly, the user can recognize the relations between the initial position I1-I4 and the current position C1-C4 according to the line patterns L1-L4.

Then, a user determines whether each of the persons O1-O4 passes across the entry and exit boundary 140 according to the initial positions I1-I4 and the current positions C1-C4 of the persons O1-O4, so as to determine whether the accumulated number of persons is incorrect (step S14 in FIG. 4). In this embodiment, the user may determine whether each of the persons O1-O4 passes across the entry and exit boundary 140 according to whether the initial positions I1-I4 and the current positions C1-C4 of the persons O1-O4 are located at opposite sides of the entry and exit boundary 140. As shown in FIG. 3, the initial position I1 and the current position C1 of the person O1 are located at opposite sides of the entry and exit boundary 140 and the person O1 walks from bottom (i.e. the initial position I1) to top (i.e. the current position C1), so the person O1 should be counted into the number of entry persons. The determination manner of the persons O2, O3 is identical to the determination manner of the person O1, so the persons O2, O3 should also be counted into the number of entry persons. Furthermore, the initial position I4 and the current position C4 of the person O4 are located at opposite sides of the entry and exit boundary 140 and the person O4 walks from top (i.e. the initial position I4) to bottom (i.e. the current position C4), so the person O4 should be counted into the number of exit persons. In an embodiment, the invention may count the person when the person leaves the screen boundary, so as to prevent miscount as the person walks around the entry and exit boundary 140.

Then, when the user determines that the accumulated number of persons is incorrect, the input device 12 receives the modified number of persons from the user (step S16 in FIG. 4). In this embodiment, the time point of obtaining the accumulated number of entry persons and the accumulated number of exit persons shown in FIG. 2 is prior to the time point of obtaining the accumulated number of entry persons and the accumulated number of exit persons shown in FIG. 3. As shown in FIG. 2, the accumulated number of entry persons is 24 and the accumulated number of exit persons is 20. In FIG. 3, since the persons O1-O3 should be counted into the number of entry persons and the person O4 should be counted into the number of exit persons, the accumulated number of entry persons should add 3 to be 27 and the accumulated number of exit persons should add 1 to be 21. However, as shown in FIG. 3, the accumulated number of entry persons is 26, so it means that one person is not counted into the accumulated number of entry persons. At this time, the user can determine that the accumulated number of persons is incorrect and then operates the input device 12 to input the modified number of persons as "+1", wherein it means that the accumulated number of entry persons needs to add one person. In an embodiment, except to input the modified number of persons as "+1", the user may also operate the input device 12 to input the modified number of persons as "27", wherein it means that the accumulated number of entry persons needs to be replaced by 27 persons. It should be noted that if the accumulated number of entry persons is 29, it means that two persons should not be counted into the accumulated number of entry persons. At this time, the user can determine that the accumulated number of persons is incorrect and then operates the input device 12 to input the modified number of persons as "−2", wherein it means that the accumulated number of entry persons needs to subtract two persons. In an embodiment, except to input the modified number of persons as "−2", the user may also operate the input device 12 to input the modified number of persons as "27", wherein it means that the accumulated number of entry persons needs to be replaced by 27 persons. Moreover, as shown in FIG. 3, the accumulated number of exit persons is 21, wherein it means that the accumulated number of exit persons is correct. Accordingly, the user needs not to do anything and just needs to continue watching the people counting video 14.

As mentioned in the above, when the user is watching the people counting video 14 and discovers that the accumulated number of persons is incorrect at different time points, the user can input the modified number of persons at different time points correspondingly. Then, the invention may evaluate the accuracy of people counting according to one or more modified numbers of persons inputted by the user.

In this embodiment, when the number of the persons in the people counting video 14 is larger than or equal to a predetermined value, the display device 10 may display the people counting video 14 with a first speed; and when the number of the persons in the people counting video 14 is smaller than the predetermined value, the display device 10 may display the people counting video 14 with a second speed, wherein the second speed is larger than the first speed. For example, provided that the predetermined value is 10, the first speed is ½ times a normal display speed, and the second speed is two times the normal display speed. When the number of the persons in the people counting video 14 is larger than or equal to 10, the display device 10 may display the people counting video 14 slowly with ½ times the normal display speed, such that the user can watch the walking path of each person clearly. On the other hand, when the number of the persons in the people counting video 14 is smaller than 10, the display device 10 may display the people counting video 14 fast with two times the normal display speed, so as to enhance the efficiency of watching the people counting video 14.

Figure 5:
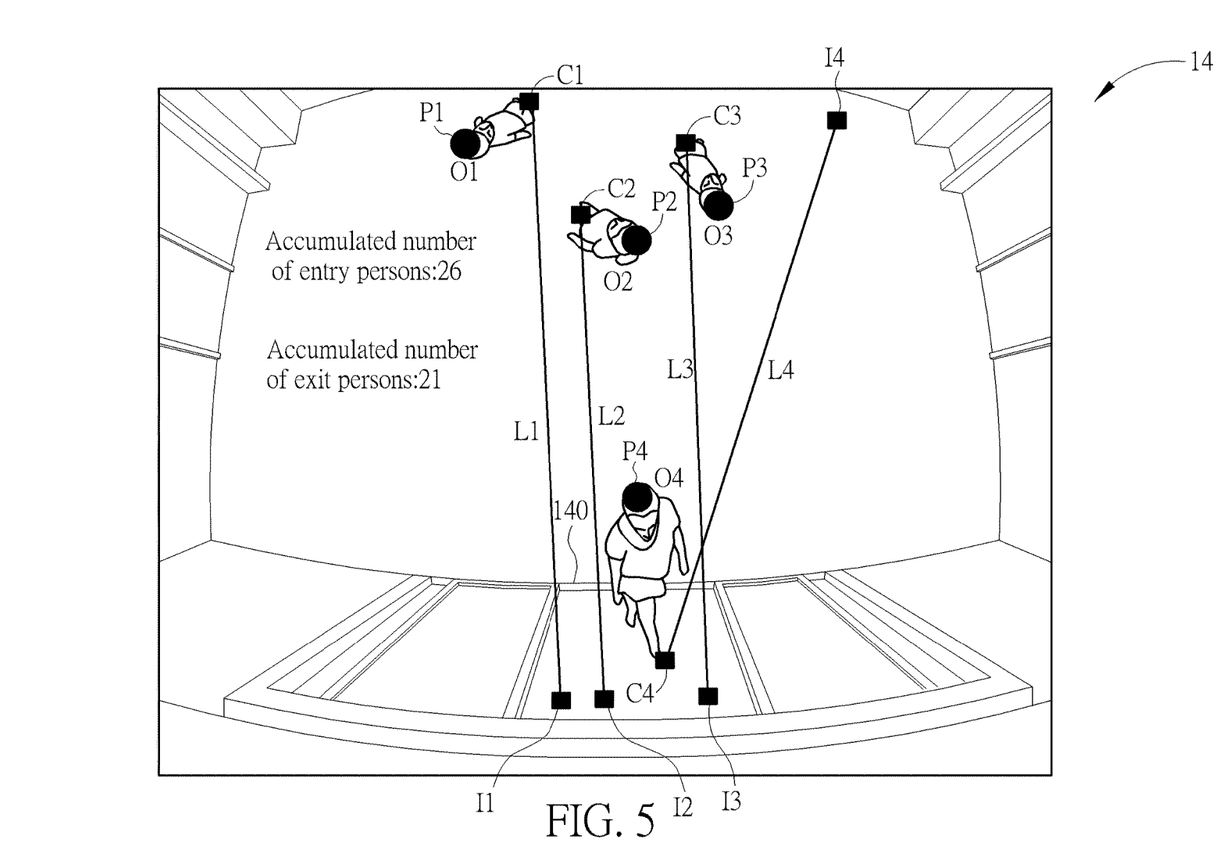
FIG. 5 is a schematic diagram illustrating the patterns displayed corresponding to the persons.

Referring to FIG. 5, FIG. 5 is a schematic diagram illustrating the patterns P1-P4 displayed corresponding to the persons O1-O4. As shown in FIG. 5, when the persons O1-O4 exist in the people counting video 14, the display device 10 may display patterns P1-P4 corresponding to the persons O1-O4. Accordingly, the user can track the walking paths of the persons O1-O4 according to the patterns P1-P4. The patterns P1-P4 shown in FIG. 5 are identical. However, the invention may display the patterns P1-P4 by different shapes (e.g. rectangle, circle, triangle, polygon, etc.), such that the user can recognize the persons O1-O4 easily. For example, when the number of the persons in the people counting video 14 is larger than the predetermined value (e.g. 10), the display device 10 may display the patterns P1-P4 by different geometrical patterns, so as to assist the user in tracking the walking path of each person more easily. Furthermore, when the number of the persons in the people counting video 14 is larger than the predetermined value (e.g. 10), the display device 10 may display the patterns P1-P4 by different colors, so as to assist the user in tracking the walking path of each person more easily.

Still further, when the frame rate of the people counting video 14 is low and the distance between the persons O1-O4 is short, the automatic people counting system may exchange the tracking blocks of the persons O1, O2 mistakenly. At this time, the invention may display the patterns P1-P4 corresponding to the persons O1-O4 with different geometrical patterns or different colors, so as to assist the user in confirming whether the tracking process is correct.

Moreover, when the person approaches a screen boundary of the people counting video 14, the display device may display the pattern with an eye-catching effect, so as to remind the user to count the person. As shown in FIG. 5, the person O1 has approached the top screen boundary of the people counting video 14 and the person O4 has approached the bottom screen boundary of the people counting video 14, so the display device 10 may display the patterns P1, P4 with the eye-catching effect (e.g. thicken or flash the patterns P1, P4), so as to remind the user to count the persons O1, O4.

Figure 6:
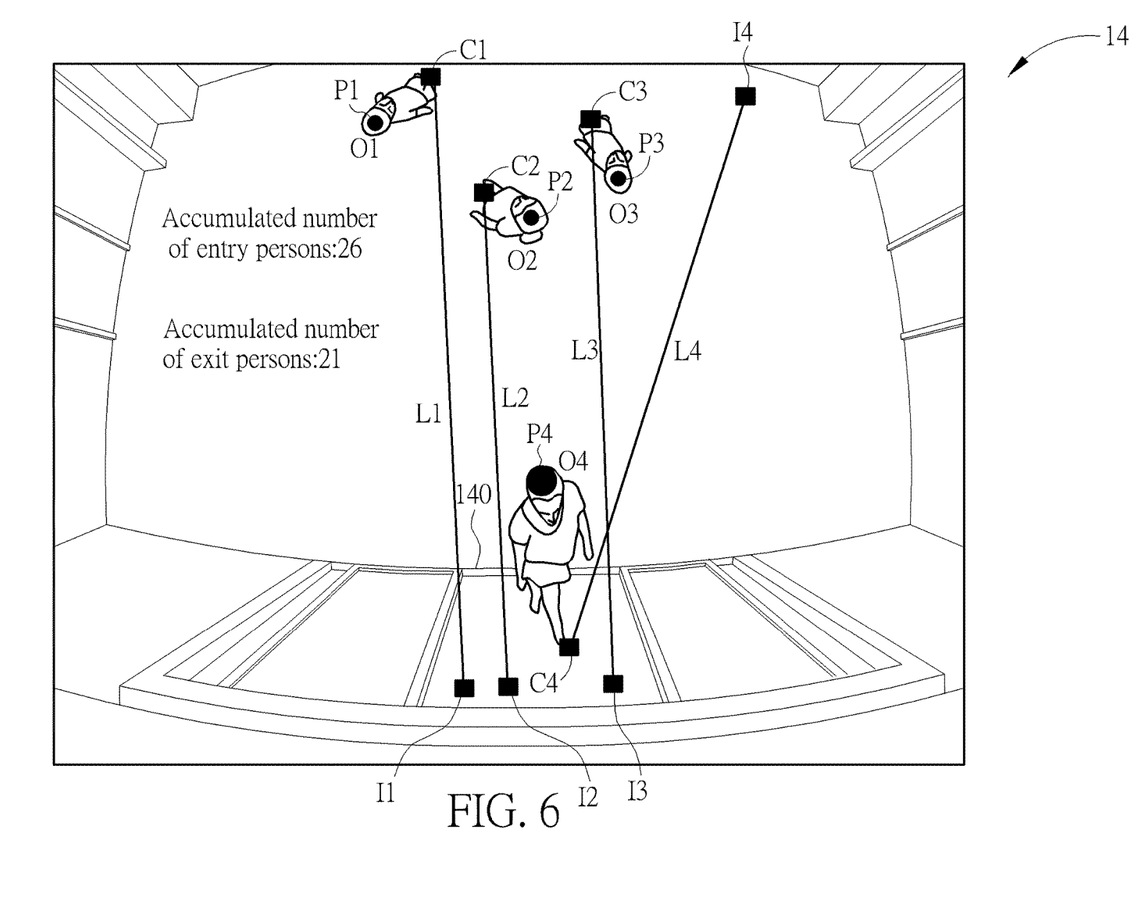
FIG. 6 is a schematic diagram illustrating the patterns corresponding to the persons displayed with different sizes.

Referring to FIG. 6, FIG. 6 is a schematic diagram illustrating the patterns P1-P4 corresponding to the persons O1-O4 displayed with different sizes. The data of the people counting video 14 may comprise height information of the person and the height information may be obtained by a stereo camera through a conventional manner. When a height of the person is larger than or equal to a predetermined height, the display device may display the pattern with a first size; and when the height of the person is smaller than the predetermined height, the display device may display the pattern with a second size, wherein the second size is smaller than the first size. For example, the aforesaid predetermined height may be set as a criterion for determining that the person is an adult or child, e.g. 140 cm. As shown in FIG. 6, the person O4 is an adult and the persons O1-O3 are children, so the height of the person O4 is larger than or equal to the predetermined height and the heights of the persons O1-O3 are smaller than the predetermined height. At this time, the display device 10 will display the pattern P4 with larger first size and display the patterns P1-P3 with smaller second size. Accordingly, the user can know that which one of the persons O1-O4 is an adult or child according to the sizes of the patterns P1-P4.

It should be noted that the control logic of the verification method for people counting of the invention can be implemented by software. The software can be executed in the verification system 1 for people counting of the invention. Needless to say, each part or function of the control logic may be implemented by software, hardware or the combination thereof. Furthermore, the control logic of the verification method for people counting of the invention may be embodied by a computer readable storage medium, wherein the computer readable storage medium stores instructions, which can be executed to generate control command for performing corresponding function.

As mentioned in the above, the user can determine whether a person passes across the entry and exit boundary according to the initial position and the current position of the person, so as to determine whether the accumulated number of persons is incorrect. When the user determines that the accumulated number of persons is incorrect, the user can operate the input device to input the modified number of persons. Accordingly, the input frequency of the user can be reduced and the user can determine whether the accumulated number of persons is incorrect more easily. Furthermore, the invention may evaluate the accuracy of people counting according to the modified number of persons inputted by the user.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A verification method for people counting comprising steps of:
   displaying a people counting video by a display device, wherein the people counting video shows an entry and exit boundary and an accumulated number of persons;
   when at least one person exists in the people counting video, displaying an initial position and a current position of each of the at least one person by the display device;
   determining whether each of the at least one person passes across the entry and exit boundary according to the initial position and the current position of each of the at least one person by a user, so as to determine whether the accumulated number of persons is incorrect;
   when the user determines that the accumulated number of persons is incorrect, receiving a modified number of persons from the user by an input device;
   when a number of the persons is larger than or equal to a predetermined value, displaying the people counting video with a first speed by the display device; and when the number of the persons is smaller than the predetermined value, displaying the people counting video with a second speed by the display device, wherein the second speed is larger than the first speed.

2. The verification method for people counting of claim 1, wherein the accumulated number of persons comprises at least one of an accumulated number of entry persons and an accumulated number of exit persons.

3. The verification method for people counting of claim 1, further comprising step of:
   when the at least one person exists in the people counting video, displaying a pattern corresponding to the person by the display device.

4. The verification method for people counting of claim 3, further comprising steps of:
   when a height of the person is larger than or equal to a predetermined height, displaying the pattern with a first size by the display device; and
   when the height of the person is smaller than the predetermined height, displaying the pattern with a second size by the display device, wherein the second size is smaller than the first size.

5. The verification method for people counting of claim 3, further comprising step of:
   when the person approaches a screen boundary of the people counting video, displaying the pattern with an eye-catching effect by the display device.

6. The verification method for people counting of claim 1, further comprising step of:
   when the at least one person exists in the people counting video, displaying a line pattern connecting the initial position and the current position of each of the at least one person by the display device.

7. A verification system for people counting comprising:
   a display device displaying a people counting video, the people counting video showing an entry and exit boundary and an accumulated number of persons; and
   an input device communicating with the display device;
   wherein when at least one person exists in the people counting video, the display device displays an initial position and a current position of each of the at least one person; a user determines whether each of the at least one person passes across the entry and exit boundary according to the initial position and the current position of each of the at least one person, so as to determine whether the accumulated number of persons is incorrect; and when the user determines that the accumulated number of persons is incorrect, the input device receives a modified number of persons from the user;
   wherein when a number of the persons is larger than or equal to a predetermined value, the display device displays the people counting video with a first speed; when the number of the persons is smaller than the predetermined value, the display device displays the people counting video with a second speed; the second speed is larger than the first speed.

8. The verification system for people counting of claim 7, wherein the accumulated number of persons comprises at least one of an accumulated number of entry persons and an accumulated number of exit persons.

9. The verification system for people counting of claim 7, wherein when the at least one person exists in the people counting video, the display device displays a pattern corresponding to the person.

10. The verification system for people counting of claim 9, wherein when a height of the person is larger than or equal to a predetermined height, the display device displays the pattern with a first size; when the height of the person is smaller than the predetermined height, the display device displays the pattern with a second size; the second size is smaller than the first size.

11. The verification system for people counting of claim 9, wherein when the person approaches a screen boundary of the people counting video, the display device displays the pattern with an eye-catching effect.

12. The verification system for people counting of claim 7, wherein when the at least one person exists in the people counting video, the display device displays a line pattern connecting the initial position and the current position of each of the at least one person.

13. A non-transitory computer readable storage medium for storing a set of computer-executable instructions, when executed, causing a display device to perform steps of:
   displaying a people counting video, wherein the people counting video shows an entry and exit boundary and an accumulated number of persons;
   displaying an initial position and a current position of each of at least one person when the at least one person exists in the people counting video, wherein a user determines whether each of the at least one person passes across the entry and exit boundary according to the initial position and the current position of each of the at least one person, so as to determine whether the accumulated number of persons is incorrect;
   receiving a modified number of persons from the user by an input device when the user determines that the accumulated number of persons is incorrect;
   displaying the people counting video with a first speed when a number of the persons is larger than or equal to a predetermined value; and
   displaying the people counting video with a second speed when the number of the persons is smaller than the predetermined value, wherein the second speed is larger than the first speed.

14. The non-transitory computer readable storage medium of claim 13, the set of computer-executable instructions, when executed, further causing the display device to perform step of:
   displaying a pattern corresponding to the person when the at least one person exists in the people counting video.

15. The non-transitory computer readable storage medium of claim 14, the set of computer-executable instructions, when executed, further causing the display device to perform steps of:
- displaying the pattern with a first size when a height of the person is larger than or equal to a predetermined height; and
- displaying the pattern with a second size when the height of the person is smaller than the predetermined height, wherein the second size is smaller than the first size.

16. The non-transitory computer readable storage medium of claim 14, the set of computer-executable instructions, when executed, further causing the display device to perform step of:
- displaying the pattern with an eye-catching effect when the person approaches a screen boundary of the people counting video.

17. The non-transitory computer readable storage medium of claim 13, the set of computer-executable instructions, when executed, further causing the display device to perform step of:
- displaying a line pattern connecting the initial position and the current position of each of the at least one person when the at least one person exists in the people counting video.

* * * * *